Nov. 2, 1948.   L. E. DALY ET AL   2,452,999
METHOD OF MAKING CELLULAR THERMOPLASTIC RECEPTACLES
Filed June 28, 1944   2 Sheets-Sheet 1

INVENTORS
LAWRENCE E. DALY
JOHN F. SCHOTT
BY
Lester G. Budlong
ATTORNEY

Nov. 2, 1948.  L. E. DALY ET AL  2,452,999
METHOD OF MAKING CELLULAR THERMOPLASTIC RECEPTACLES
Filed June 28, 1944  2 Sheets-Sheet 2
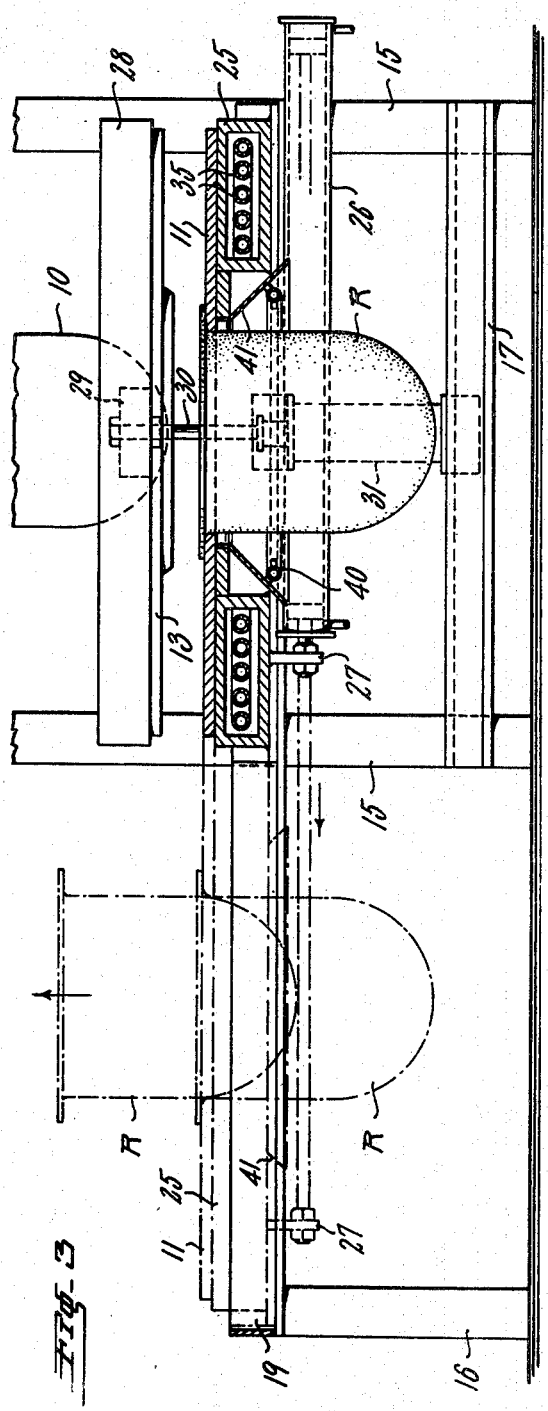
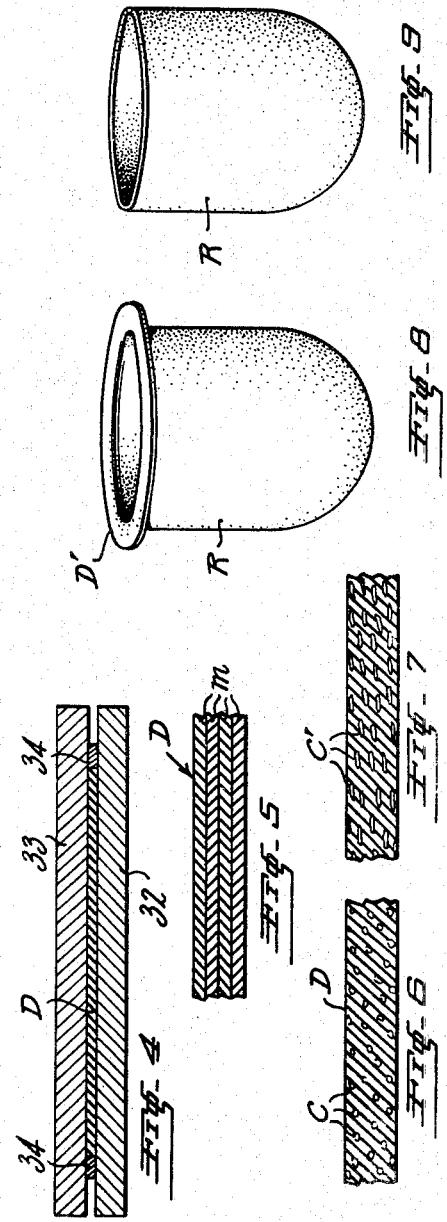
INVENTORS
LAWRENCE E. DALY
JOHN F. SCHOTT
BY
ATTORNEY Patented Nov. 2, 1948

2,452,999

UNITED STATES PATENT OFFICE 2,452,999

METHOD OF MAKING CELLULAR THERMOPLASTIC RECEPTACLES

Lawrence E. Daly, Osceola, and John F. Schott, Mishawaka, Ind., assignors to United States Rubber Company, New York, N. Y., a corporation of New Jersey Application June 28, 1944, Serial No. 542,452

4 Claims. (Cl. 18—56)

This invention relates to a receptacle of tough, stiff, cellular material formed of a composition comprising elastic rubber and hard thermoplastic resin, and particularly to the method of molding and drawing a sheet of such material to form a deep receptacle so that the cells of the sheet will be present in the finished receptacle, where they improve the dielectric properties of the receptacle.

The method contemplated by the present invention may be employed to make rounded receptacles of resinous materials for various purposes, but was developed more particularly to make molded cellular housings or containers for the radar equipment used in airplanes. It has been proposed heretofore to make the housing or container for such radar equipment from thermoplastic sheet material by cutting the material according to pattern and assembling the parts to form a container, but this requires considerable labor and forms objectionable seams in the housing.

The requirements of the housing to enclose radar equipment are exacting to a high degree. Such housing must have good dielectric properties so as not to interfere appreciably with the passage therethrough of the electric waves produced by the radar equipment. It should be formed of a non-shattering material having good impact resistance and should retain these properties throughout a wide temperature range from approximately 120° F. to about —40° F. The sheet material from which the housing is formed should be capable of being made cellular and of being drawn and molded, without destroying such cells, so as to form a large deep cellular receptacle.

A primary feature of the present invention resides in a drawn or molded receptacle of tough thermoplastic cellular material formed of a composition comprising elastic rubber, a hard thermoplastic resin that is compatible with the rubber, and a chemical blowing agent whereby the walls of the finished receptacle will have a smooth tough outer skin but the interior of such walls will contain numerous small closed cells. This reduces the weight of the receptacle for a desired wall thickness.

Another important feature of the present invention resides in a method of providing a sheet or disc of the above-mentioned thermoplastic material whereby the formation of numerous closed cells is initiated, but the expansion of such cells to an appreciable extent is restricted in the sheet so that further expansion of these cells may take place during the subsequent heating of the sheet or during the molding and drawing of the sheet into the shape of the desired receptacle.

When a drawing operation is employed the thickness of the material being drawn necessarily decreases as the drawing operation proceeds and this produces a difference in wall thickness making the walls thin where the greatest drawing takes place and thicker in other areas of the material. In the present construction this variation in wall thickness may be decreased, if desired, by heating the thinner walls more than the thick walls so that a greater expansion of the closed cells will be produced where the walls are thin.

Another important feature of the present invention resides in the method whereby the above-mentioned sheet or disc of cellular plastic material may be molded and drawn while in a hot condition into a large, deep, receptacle so that the finished receptacle will have numerous small closed cells throughout the interior of its walls and a smooth tough outer skin that is practically non-water absorbent.

Still other important features of the present invention resides in the method whereby the disc is drawn to the desired shape by stretching it tight over the rounded male member of the mold and then set in this condition, and in the method wherein a clamping pressure is exerted on the periphery of the disc to control the amount of stretch imparted to the disc and also to prevent the material from crimping as it is drawn into the space between the male and female mold parts.

The drawn and molded receptacle contemplated by the present invention is formed of a thermoplastic cellular material having a softening point preferably between 180° and 240° F.

This material is formed of a composition comprising elastic rubber either natural or synthetic, a thermoplastic resin, sulfur or other vulcanizing agent, and a chemical blowing agent. The resulting product is tough, slightly elastic and stiff enough to retain its final shape against a substantial pressure but may be distorted without shattering. In appearance and feel it resembles shoe sole leather but may be much thicker.

The elastic natural rubbers used may include natural rubber, guayule, balata or gutta percha. The synthetic rubbers used may include Buna S, Buna N, Hycar–OR–15, neoprene or butyl, etc.

The thermoplastic resins used may be cyclicized rubbers such as Marbon B, or it may be cyclicized balata, Marbon S, Isolac or Plioform, etc.

The rubber and resin used to form the present material should be compatible and should mix well when the resin is heated to its softening point, and curatives, accelerators and the like may be added.

Hycar-OR-15 is a modified copolymer of butadiene and acrylonitrile made by the Hycar Chemical Company of Akron, Ohio. Marbon B is a hard thermoplastic, resinous material which is made of purified cyclicized rubber disclosed in the McKenzie U. S. Patent No. 2,230,359 and manufactured by Marbon Corporation of Chicago, Illinois. Marbon S is a hard thermoplastic resinous polymerization product of butadiene-1,3 with a material polymerizable therewith such as styrene, and acrylonitrile, and is manufactured by the Marbon Corporation of Chicago, Illinois. Isolac is a thermoplastic material derived from rubber and disclosed in the Williams U. S. Patent 2,158,530. Plioform is modified isomerized rubber or thermoplastic resin disclosed in the Bruson U. S. Patent 1,797,188.

The following examples are given to illustrate the invention without limitation thereto. These examples have been used satisfactorily in making radar housings that are nearly three feet in diameter and over three feet deep:

*Example I*

|  | Lbs. | Oz. |
| --- | --- | --- |
| Marbon S (Resin-high softening—75° C.) | 30 |  |
| Hycar-OR-15 (Synthetic Rubber) | 7 | 8 |
| Guayule, crude | 7 | 8 |
| Zinc oxide |  | 7 |
| Agerite (antioxidant) |  | 2½ |
| Altax (accelerator) |  | 4 |
| Sulfur |  | 10 |
| Unicel (nitrogen-liberating agent)[1] |  | 12 |

*Example II*

|  | Lbs. | Oz. |
| --- | --- | --- |
| Marbon B (Resin) | 30 |  |
| #1 Pale Crepe | 12 |  |
| Stearic acid |  | 6 |
| Agerite White |  | 4 |
| Zinc oxide | 1 | 3 |
| Altax (accelerator) |  | 4 |
| Sulfur | 1 |  |
| Unicel [1] |  | 10 |

[1] A Du Pont product (contains diazo-amino benzene) which is a plasticizer for and is relatively soluble in synthetic resins and synthetic rubbers; it liberates nitrogen gas freely at 250°-300° F. and is relatively stable at processing temperatures around 200° F.

The elastic rubber (natural or synthetic), thermoplastic resin and sulphur or other vulcanizing material are thoroughly mixed in a mixing mill at a sufficiently high temperature to soften the resin. The gas producing agent is then added near the end of the mixing operation so that the heat employed during the mixing operation will not cause the gas-producing agent to blow. This mixed material is then preferably calendared into a sheet that may be several hundredths of an inch thick to make the radar housing abovementioned. Several of these uncured thin calendar sheets are preferably placed one on top of the other so that the grain of the different sheets extends at an angle to each other to thereby provide a stronger sheet having fewer air pockets than would probably occur in a single sheet as thick as this composite sheet.

This uncured ply sheet or a relatively large disc of the same is then preferably placed between the flat plates of a heated platen press adapted to be operated under considerable pressure, and between such plates are preferably placed metal limiting strips that are slightly thinner than the uncured ply sheet so that the platen may be closed sufficiently to compress the sheet approximately 10%. The ply sheet while in this compressed condition is partly vulcanized by subjecting it to a temperature of about 220 to 300° F. from about four to ten minutes. This serves to bond the several sheets together and to render active the blowing agent so as to initiate the formation of numerous small closed cells, but these cells are prevented from expanding appreciably by the platen pressure which maintains the thickness of the sheet at this time slightly less than the thickness of the unblown sheet when it was placed in the platen press. These minute closed cells will be formed throughout the interior of the sheet but the faces of the sheet which come in direct contact with the surfaces of the platen will be rendered smooth and more dense.

As soon as this sheet is partly vulcanized by the heat of the platen press the vulcanization operation is arrested by removing the sheet from the platen press and quickly cooling it with water.

The treatment so far described produces a hard, tough, slightly elastic thermoplastic sheet having numerous small closed cells in which the gas from the blowing agent is confined, and since the sheet is formed of elastic rubber and a compatible thermoplastic resin it will have considerable stiffness from the resin but will lack the brittleness of an all resin sheet. This sheet when heated to soften the same can be stretched and drawn to a substantial degree without liberating the confined gas, but the cells which are more or less spherical in shape may become elongated as the sheet is drawn.

The partially vulcanized disc having the minute unexpanded cells may now be heated in preparation for the molding and drawing operation where it is given the desired receptacle shape, and in order to form a radar housing nearly three feet in diameter and nearly four feet deep the disc just mentioned should be somewhere near five feet in diameter. In order that this sheet may be readily stretched and drawn it is heated for approximately one-half hour at from 250° to 300° F. but preferably at 280° F., and during this heating operation the disc may expand in thickness about 100% so that a disc which was slightly more than half an inch thick when placed in this heating chamber will be slightly over an inch thick when removed therefrom and placed in the mold.

This mold preferably consists of a flat ring forming the female member of the mold and a rounded plunger which is somewhat smaller than the opening in the ring and which forms the male member of the mold. The construction is such that as the plunger is forced slowly through the opening in the ring it will draw and mold the disc into the shape of the final receptacle. During the first portion of the drawing operation a slight pressure is preferably exerted by a clamping ring upon the peripheral portions of the disc to thereby prevent the portions of the disc going between the molding members from becoming crimped. When this drawing operation is from one-half to three-fourths completed the marginal edges of the disc are preferably firmly clamped so as to stretch the disc material during the remaining portion of the drawing operation, to thereby draw it tightly about the plunger and cause it to conform accurately to the shape of the plunger. After the drawing operation is completed the drawn receptacle should be cooled in the mold so as to set the thermoplastic material in this final shape, and when cool it may be removed from the mold.

The above and other features of the present invention will be further understood from the following description when read in connection with the accompanying drawings wherein:

Fig. 3 is a longitudinal sectional view through the machine of Fig. 1;

Fig. 4 is a sectional view through the upper and lower plates of a platen press to be described;

Fig. 5 is a sectional view through a ply sheet of thermoplastic material used to make the radar housing;

Fig. 6 shows the material of Fig. 5 after it has been partly vulcanized to blend the several plies together and produce the formation of minute closed cells;

Fig. 7 shows the material of Fig. 6 after the same has been drawn or stretched so that the cells are elongated;

Fig. 8 is a perspective view of a radar housing as it appears upon being removed from the machine of Fig. 1; and Fig. 9 is a view similar to Fig. 8 showing the appearance of the radar housing after the flange at its upper edge has been removed.

Figure 1:
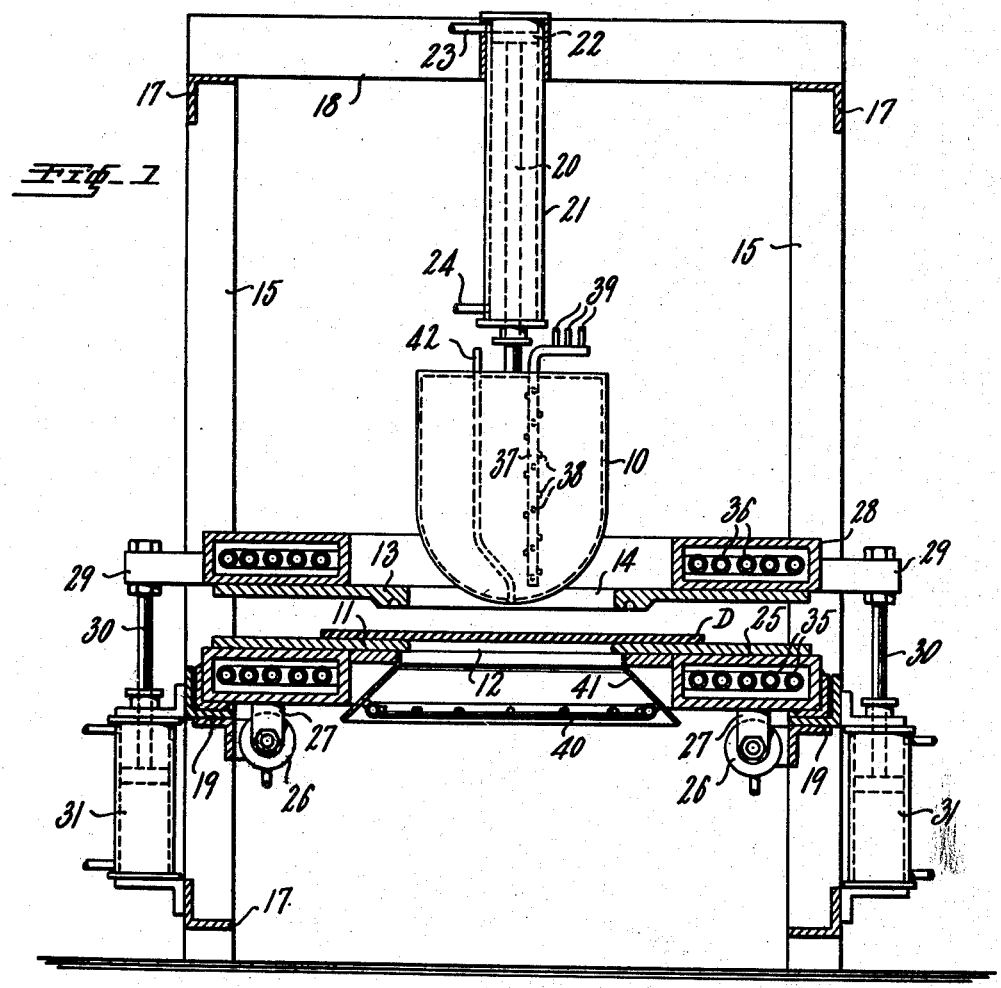
Fig. 1 is a transverse sectional view through a machine provided with a power operated mold for making the receptacle of the present invention, the molding plunger being raised.

The apparatus employed to make the receptacles of the present invention and to carry out the method of the present invention may be varied extensively. The essential parts are a rounded male molding member 10 and a female molding member 11 which preferably has the form of a flat table-like ring having a central opening 12 therethrough which is slightly larger than the plunger 10 so as to shape and mold the plastic sheet material between the plunger 10 and ring 11 as the plunger enters the opening 12 in this ring. A third important piece of apparatus employed in carrying out the present method is the clamping ring 13 which has a central opening 14 therethrough to receive the plunger 10. The purpose of this clamping ring 13 is to cooperate with the molding ring 11 to exert a controlled clamping action, throughout the drawing operation, upon the material which is being converted into a radar housing or other type of receptacle. During the first portion of the drawing operation the clamping pressure exerted by the ring 13 is relatively light so as to exert just enough pressure upon the sheet material to prevent it from crimping as it is forced into the opening 12 of the ring 11 by the gradual downward movement of the plunger 10.

An important feature of the present invention resides in the method whereby a sheet or disc D which is to be drawn and molded into the shape of a receptacle R is caused to conform accurately to the contour of the plunger 10. This is accomplished by operating the clamping ring 13 so as to clamp tightly the outer peripheral portions of the disc D before the plunger 10 has completed its downward stroke, so that when the plunger is further lowered it will stretch or draw the material of the disc D about its rounded end portion to cause this material to conform accurately to the contour of the plunger, as will be apparent from Fig. 2 wherein it will be seen that the disc D has been converted into the receptacle or radar housing R.

In order to operate the parts just described, to form a large receptacle of thermoplastic material, that may be several feet in diameter and have walls that are one-half inch or more thick, considerable power is required to operate the plunger 10 and the clamping ring 13. The machine illustrated in the drawings is therefore made relatively heavy to support and operate the part just described and other mechanism to be described.

The machine shown has the tall uprights 15 and shorter uprights 16. The tall uprights 15 are connected by longitudinally extending beams 17 and transversely extending beams 18, and extending lengthwise of the entire machine to form a runway at the desired distance from the floor and secured to the uprights 15 and 16 are the longitudinal side-rails 19.

The plunger 10 is supported centrally within the enclosure formed by the four uprights 16 for vertical movement. To this end there is rigidly secured to the upper end of the plunger 10 the operating shaft 20 which slides within the hydraulic cylinder 21 and has the piston 22 at its upper end. The cylinder 21 is rigidly supported by beams connected to the rails 18. Hydraulic operating liquid such for example as oil is supplied to one end or the other of the cylinder 21 by the pipes 23 and 24. This operating liquid may be supplied to the cylinder 21 at a pressure of several hundred pounds per square inch to operate the plunger 10 with the required force.

In the construction shown the female molding member or ring 11 is not raised or lowered but is supported for sliding movement along the runways provided by the beams 19, so that after the molding operation is completed and the plunger 10 is raised to the position in which it is shown in Fig. 3, the table 25 upon which the ring 11 is mounted may be moved to the left viewing Fig. 3 from the position in which it is shown in section to the position in which it is shown in dotted line, so as to get the completed molded radar housing R to one side of the plunger 10 so that it may be removed from the ring 11 by forcing the receptacle R upwardly to the second dotted position in which it is shown at the left-hand portion of the drawing of Fig. 3.

The table 25 which slides along the tracks provided by the rails 19 is moved back and forth, in the construction shown, along these tracks by the hydraulic cylinders 26 having operating plungers the outer ends of which are secured to the brackets 27 extending downwardly from the table 25.

The clamping ring 13 likewise has to be operated with considerable force, particularly during the latter portion of the drawing operation for imparting the final shape to the receptacle R. Therefore in the construction shown the ring 13 is rigidly secured to a frame 28 having projecting from the opposite sides thereof the lug-like members 29 which are rigidly secured to the upper ends of the hydraulic pistons 30 that operate within the hydraulic cylinders 31, adapted to raise and lower the clamping ring 13 as desired. The hydraulic cylinder 21 for operating the plunger 10 is manually controlled by a suitable valve not shown. The two cylinders 26 for moving the table 25 on its runways are controlled by another manually operated valve not shown, and the two cylinders 31 for raising and lowering the clamping ring 13 are controlled by a third manually operated valve not shown.

In preparing the disc D for use in making the receptacle contemplated by the present invention several thin sheets of uncured thermoplastic material m are preferably plied together as shown in Fig. 5. This sheet or disc D of uncured material is then preferably placed in a heated platen press of well known construction having the lower platen plate 32 and upper platen plate 33 as shown in Fig. 4. The extent to which these plates may be moved one towards the other is preferably limited by the stop strips 34, and the thickness of these strips 34 is preferably, as above stated, slightly less than the thickness of the disc D when it is first introduced into the platen press. The heat of the platen press will cause the formation of minute closed cells within the interior of the disc D while the heat of the plates will impart a smooth surface to each face of the disc D. After the disc D has remained in the heated platen press for a few minutes it should be removed and cooled quickly so as to prevent the disc from blowing appreciably after it is relieved from the confining pressure of the press.

The partially vulcanized disc D upon leaving the platen press of Fig. 4 will have the general appearance in sections shown in Fig. 6 wherein the lines between the plies m will have disappeared, and the small cells C will have been produced. The disc of Fig. 6 may be kept on hand until it is desired to shape the same upon the machine of Figs. 1, 2 and 3. Before transferring the disc D of Fig. 6 to the position in which it is shown in Fig. 1 of the drawing it should be heated, as above stated, to approximately 280° F. for about half an hour to render it relatively soft and plastic. The machine shown in Figs. 1, 2 and 3 should preferably be operated in a room maintained at a temperature between 80° and 90° F. so as to keep the disc D from chilling at the surface and causing cracks. Furthermore, the plunger 10, before starting its drawing operation should be heated to a temperature of about 125 to 150° F. and the clamping ring 13 should be heated to a similar temperature, while the forming ring 11 should preferably be maintained at the temperature of 160° to 170° F. The ring 11 may be heated by the hot water or steam coils 35 and the ring 13 may be similarly heated by the coils 36.

The plunger 10 preferably is maintained at the desired temperature by providing a pipe 37 extending downwardly inside of the hollow plunger and having apertures 38 formed therein through which steam or hot water may be supplied to the interior of the plunger to heat the same. After the drawing operation is completed the plunger 10 may be cooled to set the thermoplastic receptacle R by introducing cold water or air into the receptacle through the pipe 37. The steam, water or air whichever is desired may be supplied to the pipe 37 through the connections 39.

When the disc D is hot and the metal parts 10, 11 and 13 of the press which contact the disc are heated, as just described, the disc D may be placed in the position in which it is shown in Fig. 1 of the drawing. The plunger 10 is then slowly lowered to distort the disc D and force it through the ring 11, but before the disc D has been distorted very much the clamping ring 13 is preferably lowered into slight clamping engagement with the outer marginal portions of this disc to maintain it approximately flat and prevent the disc from crimping as it enters the space between the plunger 10 and ring 11.

After the plunger has descended over one half of its drawing stroke but less than three-fourths thereof, the ring 13 should be clamped hard against the marginal portions of the disc so as to hold the marginal portion against further movement. This will cause the stretching or drawing of the portion of the disc which engages the plunger 10 throughout the remaining stroke of the plunger, and will impart accurately to the receptacle the contour of the plunger 10.

After the drawing operation is completed the thermoplastic receptacle should be cooled while the parts of the mold are maintained in this last mentioned position. The receptacle R may be quickly cooled by spraying cold water into the plunger 10 through the pipe 37 and by spraying cold water upon the outside of the receptacle R from the nozzles formed in the pipe 40 which encircles the receptacle R. A metal guard or annular apron 41 is preferably provided around the cooling pipe 40 to prevent the cold water supplied by this pipe from contacting the molding ring 11 to chill it.

Figure 2:
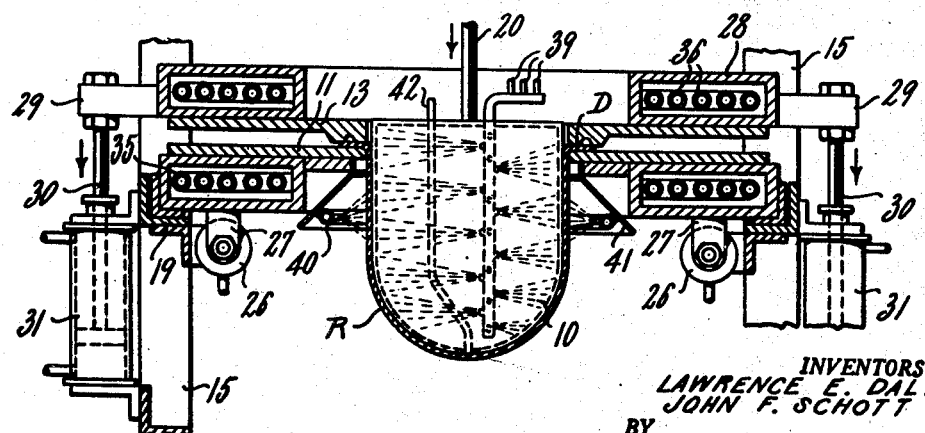
Fig. 2 is a similar view showing the molding plunger in the lowered position to shape the receptacle.

As soon as the radar housing R is cooled sufficiently to set the same so that it will maintain its shape shown in Fig. 2 the plunger 10 may be raised, and in order to relieve any vacuum that might tend to be produced as the plunger is pulled out of the receptacle R, the pipe 42 is provided which is open to the air at its upper end and extends downwardly in the hollow plunger 10 and through a hole at the lower end of the plunger so as to admit air to the interior of the receptacle R.

After the plunger 10 is completely raised as shown in Fig. 3, the table 25 may be slid along its runways to the position in which it is shown in dotted lines in Fig. 3 so that the receptacle or radar housing R may be removed from the ring 11, whereupon it will have the appearance shown in Fig. 8 and will have the annular flange D' which was clamped between the rings 11 and 13 during the final drawing operation. This flange D' may be cut away, whereupon the receptacle R will have the desired final construction shown in Fig. 9. This receptacle is stiff or rigid enough to retain its shape under severe pressure and is so tough that it will not shatter under severe blows.

During the operation of stretching and drawing the disc D to the desired final shape the small cylindrical cells C will be stretched or elongated so that in the completed receptacle they will have the elliptical appearance indicated by C' in Fig. 7 of the drawing.

It will be seen from the foregoing that the apparatus required to carry out the present method is relatively inexpensive to manufacture and operate, and that by employing the present method it is possible to provide a large thermoplastic receptacle of cellular construction, which cells reduce the weight of the receptacle R and are found to greatly improve its dielectric properties.

Having thus described our invention, what we claim and desire to protect by Letters Patent is:

1. The method of making a cellular, hard, tough, slightly elastic thermoplastic receptacle, which comprises the steps of mixing rubber having good elastic properties when vulcanized with a resin selected from the class of hard thermoplastic resin of cyclized rubbers, hard thermoplastic resinous polymerization product of butadiene-1, 3 with styrene, hard thermoplastic resinous polymerization product of butadiene-1, 3 with acrylonitrile, in amounts ranging from about 2 parts resin and 1 of rubber to 2½ parts resin and 1 of rubber, to provide a composition having a wide plastic range and which contains a vulcanizing agent and chemical blowing agent, sheeting this mix, heating the sheet to partly vulcanize the rubber and soften the resin and blow the agent to form numerous cells of gas sealed in the sheet and held by the resin from rupturing, then drawing and molding the cellular sheet while hot into a receptacle.

2. The method of making a cellular, hard, tough, slightly elastic thermoplastic receptacle, which comprises the steps of mixing rubber having good elastic properties when vulcanized with a resin selected from the class of hard thermoplastic resin of cyclized rubbers, hard thermoplastic resinous polymerization product of butadiene-1, 3 with styrene, hard thermoplastic resinous polymerization product of butadiene-1, 3 with acrylonitrile, in amounts ranging from about 2 parts resin and 1 of rubber to 2½ parts resin and 1 of rubber, to provide a composition having a wide plastic range and which contains a vulcanizing agent and chemical blowing agent, sheeting this mix, plying several of these sheets together in crossing relation, heating the ply sheet thus produced to partially vulcanize the rubber, unite the sheets, soften the resin and blow the agent to form numerous cells of gas sealed in the sheet and held by the resin from rupturing, then molding this sheet while hot into a receptacle.

3. The method of making a cellular, hard, tough, slightly elastic thermoplastic receptacle, which comprises the steps of mixing rubber having good elastic properties when vulcanized with a resin selected from the class of hard thermoplastic resin of cyclized rubbers, hard thermoplastic resinous polymerization product of butadiene-1, 3 with styrene, hard thermoplastic resinous polymerization product of butadiene-1, 3 with acrylontrile, in amounts ranging from about 2 parts resin and 1 of rubber to 2½ parts resin and 1 of rubber, to provide a composition having a wide plastic range and which contains a vulcanizing agent and chemical blowing agent, sheeting this mix, heating the sheet to partly vulcanize the rubber and soften the resin and blow the agent to form numerous cells of gas sealed in the sheet and held by the resin from rupturing, then shaping this sheet into a receptacle partly by molding the same and partly by drawing the sheet while its marginal edges are clamped against movement.

4. The method of making a cellular, hard, tough, slightly elastic thermoplastic receptacle, which comprises the steps of mixing rubber having good elastic properties when vulcanized with a resin selected from the class of hard thermoplastic resin of cyclized rubbers, hard thermoplastic resinous polymerization product of butadiene-1, 3 with styrene, hard thermoplastic resinous polymerization product of butadiene-1, 3 with acrylonitrile, in substantial amounts of the resin and rubber but considerably more resin by weight than rubber to provide a composition having a wide plastic range and which contains a vulcanizing agent and chemical blowing agent, sheeting this mix, heating the sheet to partly vulcanize the rubber and soften the resin and blow the agent to form numerous cells of gas sealed in the sheet and held by the resin from rupturing, then drawing and molding the cellular sheet while hot into a receptacle.

LAWRENCE E. DALY.
JOHN F. SCHOTT.

REFERENCES CITED

The following references are of record in the file of this patent:

UNITED STATES PATENTS

| Number | Name | Date |
| --- | --- | --- |
| 669,331 | Thurber | Mar. 5, 1901 |
| 1,482,707 | Skinner | Feb. 5, 1924 |
| 1,857,087 | Lindermann | May 3, 1932 |
| 1,905,269 | Denton | Apr. 25, 1933 |
| 1,933,441 | Laursen | Oct. 31, 1933 |
| 1,983,677 | Riley | Dec. 11, 1934 |
| 2,158,086 | Roberts et al. | May 16, 1939 |
| 2,208,583 | Hoof | July 23, 1940 |
| 2,223,321 | Kempe | Nov. 26, 1940 |
| 2,296,305 | Roberts | Sep. 22, 1942 |
| 2,297,018 | Overstreet | Sep. 29, 1942 |
| 2,299,593 | Roberts et al. | Oct. 20, 1942 |
| 2,325,903 | Blair et al. | Aug. 3, 1943 |
| 2,378,642 | Kopplin | June 19, 1945 |
| 2,379,464 | Thies | July 3, 1945 |

FOREIGN PATENTS

| Number | Country | Date |
| --- | --- | --- |
| 628,052 | France | Nov. 16, 1926 |

OTHER REFERENCES

Marbon Corp., pub. May 13, 1940. (Copy in Div. 50.)

Marbon B in Rubber and Synthetic Compounds, pub. Oct. 22, 1941. (Copy in Div. 50.)